United States Patent [19]
Jenkins

[11] Patent Number: 5,801,618
[45] Date of Patent: Sep. 1, 1998

[54] VEHICLE ALARM AND LOT MONITORING SYSTEM

[76] Inventor: Mark Jenkins, P.O. Box 37, Brooks, Alberta, Canada, T1R 1B2

[21] Appl. No.: 797,533

[22] Filed: Feb. 7, 1997

Related U.S. Application Data

[60] Provisional application No. 60/011,319 Feb. 8, 1996.
[51] Int. Cl.$^6$ ................................................ B60R 25/10
[52] U.S. Cl. ...................... 340/426; 340/429; 340/438; 340/937; 340/539
[58] Field of Search .......................... 340/426, 429, 340/438, 932.2, 937, 539; 348/143, 148; 307/10.2

[56] References Cited

U.S. PATENT DOCUMENTS

| | | | |
|---|---|---|---|
| 5,319,698 | 6/1994 | Glidewell et al. | 340/426 |
| 5,557,254 | 9/1996 | Johnson et al. | 340/426 |
| 5,563,579 | 10/1996 | Carter | 340/426 |
| 5,612,668 | 3/1997 | Scott | 340/426 |

*Primary Examiner*—Jeffery A. Hofsass
*Assistant Examiner*—Sihong Huang
*Attorney, Agent, or Firm*—Kenneth A. Roddy

[57] ABSTRACT

A programmable alarm and lot monitoring system monitors a plurality of individual vehicles congregated together in a given area. A central server transmits RF signals to individual RF transponder sensor units installed on respective individual vehicles and receives RF signals from the Rf transponder units. Each RF transponder unit senses a change in the status of the respective vehicle and, upon sensing a change, transmits an RF violation signal to the central server and also honks the horn, flashes the lights, and/or sounds an audible alarm. The central server may activate a remote video camera to record the scene of the violation, and if moved, follow the movement of the vehicle until out of camera range and transmit a violation message to a remote security station. In a global alarm mode, all of the individual RF transponder units honk the horn, flash the lights, and/or sound the alarm on all of the vehicles upon one of the units sensing a violation. Each RF transponder unit may be programmed to disconnect the battery of the vehicle upon sensing a violation, and to sense the vehicle battery voltage and notify the central server of the vehicle having a weak battery. In a vehicle locate mode selected RF transponder units flash the lights, honk the horn, or sound an alarm upon receiving a signal from the central server so that a particular vehicle may be easily located out of a group of vehicles. The RF transponder units may be polled by the central server at selective times to determine which vehicles are in inventory and which are not.

24 Claims, 3 Drawing Sheets

VEHICLE ALARM AND LOT MONITORING SYSTEM

BACKGROUND OF THE INVENTION

This application claims benefit of U.S. Provisional application Ser. No. 60/011,319, filed Feb. 8, 1996.

FIELD OF THE INVENTION

This invention relates generally to vehicle alarm systems, and more particularly to a programmable vehicle alarm and lot monitoring system having audible alarm features, a global alarm feature wherein violation of one of the vehicles will activate alarms in all of the vehicles, and additionally is used for identification, monitoring, and inventory control of a large number of vehicles.

BRIEF DESCRIPTION OF THE PRIOR ART

Vehicle alarm systems and alarm systems which will sound an alarm and call a central unit to report an alarm condition or request emergency response are known in the art. However, none of these systems provide the combination of utilitarian features of the present system.

Glidewall et al, U.S. Pat. No. 5,319,698 discloses a security system for vehicles stored in a security area that detects various abnormal conditions including low battery voltage and transmits a signal which identifies each sensor unit and the individual unit on which it is located. A slave transmitter provides a signal to a local security station which identifies the particular sensor unit which was activated and the individual unit where the actuated sensor resides.

Carlo et al, U.S. Pat. No. 5,287,006 discloses an anti-theft device which can be connected onto a battery and prevents the engine from being started and is controlled by a command signal from a remote transmitter.

Choi, U.S. Pat. No. 5,164,979 discloses a security and alarm system using telephone lines to transmit video images to a remote location for vehicles stored in a security area that detects various abnormal conditions including low battery voltage and transmits a signal which identifies each sensor unit and the individual unit on which it is located. A slave transmitter provides signal to a local security station which identifies the particular sensor unit which was activated and the individual unit where the actuated sensor resides.

The following U.S. Patents disclose various alarm systems which will sound an alarm and/or call a central unit to report an alarm condition or request emergency response: Gray, U.S. Pat. No. 5,200,987; Robinson et al, U.S. Pat. No. 5,159,344; Bonaquist, U.S. Pat. No. 5,136,281; Sheffer, U.S. Pat. No. 4,891,650; Howell, U.S. Pat. No. 4,284,973; and Kelley et al, U.S. Pat. No. 4,218,763.

The present invention is distinguished over the prior art in general, and these patents in particular by a programmable alarm and lot monitoring system which monitors a plurality of individual vehicles congregated together in a given area. A central server transmits RF signals to individual RF transponder sensor units installed on respective individual vehicles and receives RF signals from the RF transponder units. Each RF transponder unit senses a change in the status of the respective vehicle and, upon sensing a change, transmits an RF violation signal to the central server and also honks the horn, flashes the lights, and/or sounds an audible alarm. The central server may activate a remote video camera to record the scene of the violation, and if moved, follow the movement of the vehicle until out of camera range and transmit a violation message to a remote security station. In a global alarm mode, all of the individual RF transponder units honk the horn, flash the lights, and/or sound the alarm on all of the vehicles upon one of the units sensing a violation. Each RF transponder unit may be programmed to disconnect the battery of the vehicle upon sensing a violation, and to sense the vehicle battery voltage and notify the central server of the vehicle having a weak battery. In a vehicle locate mode selected RF transponder units flash the lights, honk the horn, or sound an alarm upon receiving a signal from the central server so that a particular vehicle may be easily located out of a group of vehicles. The RF transponder units may be polled by the central server at selective times to determine which vehicles are in inventory and which are not.

SUMMARY OF THE INVENTION

It is therefore an object of the present invention to provide a vehicle alarm and lot monitoring system having audible vehicle alarm features in combination with other operational features which are particularly useful for automobile dealerships, used vehicle lots, and business vehicle fleets.

It is another object of this invention to provide a vehicle alarm and lot monitoring system having a global alarm feature wherein violation of one of the vehicles will activate alarms in a plurality of nearby vehicles.

Another object of this invention is to provide a vehicle alarm and lot monitoring system which allows identification, monitoring, and inventory control of a large number of vehicles.

Another object of this invention is to provide a vehicle alarm and lot monitoring system having a plurality of remote programmable RF transponder/sensor node units installed on individual vehicles which receive and transmit RF signals between a central server unit.

Another object of this invention is to provide a vehicle alarm and lot monitoring system having a plurality of remote programmable RF transponder/sensor node units installed on individual vehicles which will activate an alarm upon detecting a violation and transmit a corresponding signal to a central server unit, and may also disable power to the starting circuitry to prevent starting of the vehicle.

Another object of this invention is to provide a vehicle alarm and lot monitoring system having a plurality of remote programmable RF transponder/sensor node units installed on individual vehicles which will activate an alarm upon detecting a violation and transmit a corresponding signal to a central server unit which in turn may be programmed to transmit a message to a remote security monitoring station to report the violation.

Another object of this invention is to provide a vehicle alarm and lot monitoring system having a plurality of remote programmable RF transponder/sensor node units installed on individual vehicles which may be programmed to be armed or disarmed for selective time intervals.

Another object of this invention is to provide a vehicle alarm and lot monitoring system having a plurality of remote programmable RF transponder/sensor node units installed on individual vehicles which may be programmed to identify the particular vehicle on which it is installed, and may be polled by a central server unit at selective times to determine which vehicles are in inventory and which are not.

Another object of this invention is to provide a vehicle alarm and lot monitoring system having a plurality of remote programmable RF transponder/sensor node units installed on individual vehicles which may be programmed to detect the condition of the vehicle battery and transmit a corresponding signal to a central server unit to identity of the particular vehicle having a weak battery.

Another object of this invention is to provide a vehicle alarm and lot monitoring system having a plurality of remote programmable RF transponder/sensor node units installed on individual vehicles which may be programmed to flash the lights, honk the horn, or sound an alarm upon receiving a signal from a central server unit whereby a particular vehicle may be easily identified and located out of a group of vehicles.

A further object of this invention is to provide a vehicle alarm and lot monitoring system having a plurality of remote programmable RF transponder/sensor node units installed on individual vehicles which will transmit a signal to a central server unit upon detecting a violation which will then activate a remote video camera and latching signal to record the scene of the vehicle being violated and, if the vehicle is moved, to follow the movement of the vehicle until out of camera range.

A still further object of this invention is to provide a vehicle alarm and lot monitoring system which is simple to install and reliable in operation.

Other objects of the invention will become apparent from time to time throughout the specification and claims as hereinafter related.

The above noted objects and other objects of the invention are accomplished by a programmable alarm and lot monitoring system which monitors a plurality of individual vehicles congregated together in a given area. A central server transmits RF signals to individual RF transponder sensor units installed on respective individual vehicles and receives RF signals from the RF transponder units. Each RF transponder unit senses a change in the status of the respective vehicle and, upon sensing a change, transmits an RF violation signal to the central server and also honks the horn, flashes the lights, and/or sounds an audible alarm. The central server may activate a remote video camera to record the scene of the violation, and if moved, follow the movement of the vehicle until out of camera range and transmit a violation message to a remote security station. In a global alarm mode, all of the individual RF transponder units honk the horn, flash the lights, and/or sound the alarm on all of the vehicles upon one of the units sensing a violation. Each RF transponder unit may be programmed to disconnect the battery of the vehicle upon sensing a violation, and to sense the vehicle battery voltage and notify the central server of the vehicle having a weak battery. In a vehicle locate mode selected RF transponder units flash the lights, honk the horn, or sound an alarm upon receiving a signal from the central server so that a particular vehicle may be easily located out of a group of vehicles. The RF transponder units may be polled by the central server at selective times to determine which vehicles are in inventory and which are not.

DESCRIPTION OF THE PREFERRED EMBODIMENT

Figure 1:
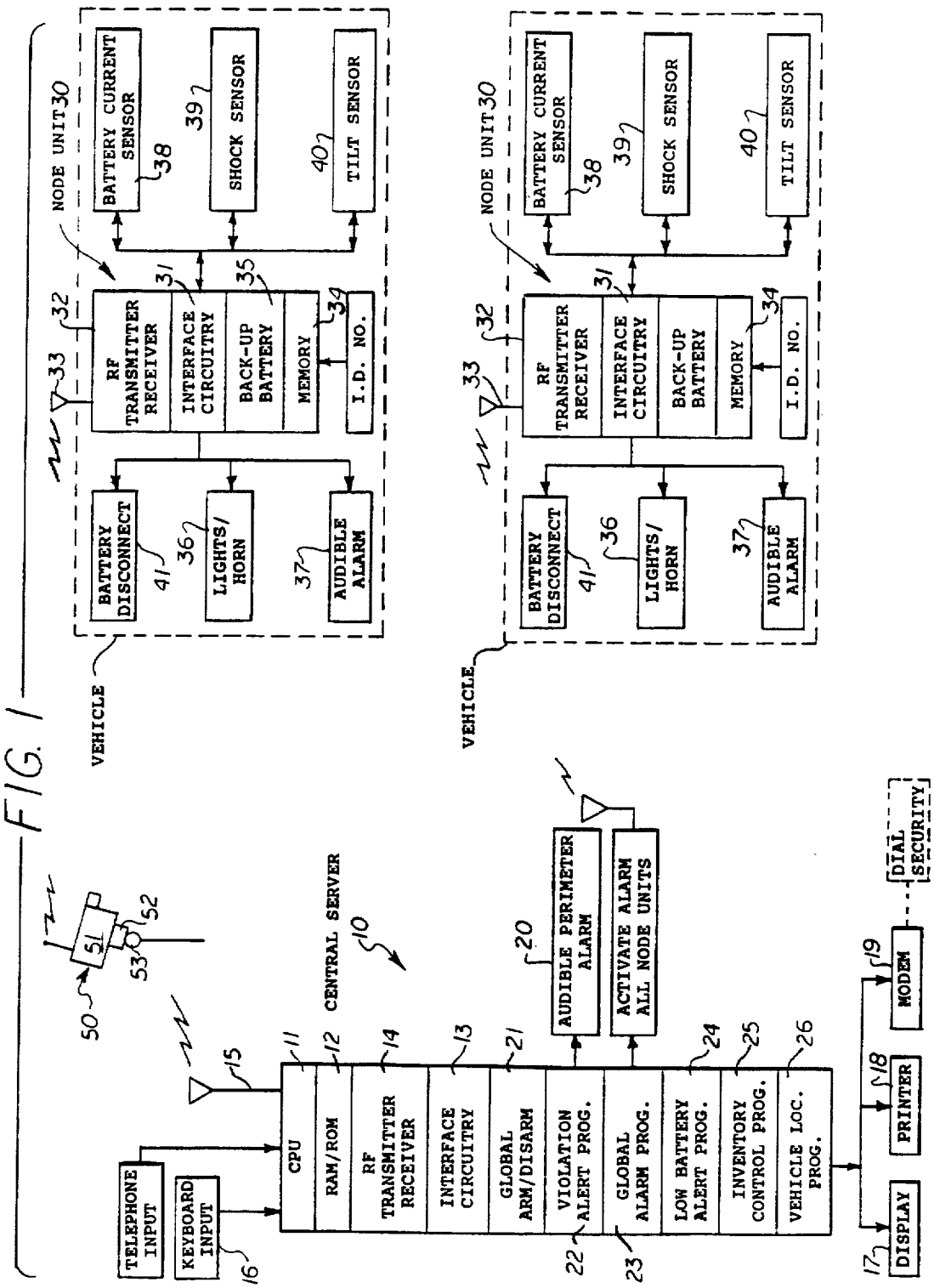
FIG. 1 is a block diagram illustrating the vehicle alarm and lot monitoring system in accordance with the present invention.

Referring to the drawings by numerals of reference, there is shown in FIG. 1, a schematic block diagram of a preferred vehicle alarm and lot monitoring system in accordance with the present invention which monitors a plurality of individual vehicles congregated together in a given area.

The major components of the present system are a programmable central monitoring unit or "central server" 10 which transmits RF (radio frequency) signals to a plurality of individual remote programmable RF transponder/sensor units hereinafter referred to as "node units" 30 installed on respective individual vehicles and receives RF signals from the RF transponder node units. Each individual RF transponder node unit 30 is installed in the engine compartment on a vehicle to be monitored adjacent the vehicle battery. In a preferred embodiment, the node unit 30 is secured by hook and loop fasteners, magnets, or other conventional fastening means and electrically connected between one of the battery terminals and common ground.

The programmable central monitoring unit or "central server" 10 includes a microprocessor and central processing unit (CPU) 11 with RAM and ROM memory 12 connected through interface circuitry 13 to an RF (radio frequency) transmitter/receiver, hereinafter referred to as RF transceiver 14 for transmitting and receiving RF signals via antenna 15. The CPU is also operatively connected with a mouse, keyboard, or other input device 16, a video display 17, a printer 18, a modem 19, and an audible perimeter alarm device 20.

The interface circuitry 13, microprocessor circuitry, and connections between the components is conventional in the field of computers and electronics and is therefore not shown in detail. The interface circuitry between the CPU 11 and the RF transceiver 14 of the central server 10 is also conventional in the art. The microprocessor and CPU 11 operates in response to digital code signals which are encoded by the RF transceiver 14 and transmitted through the atmosphere by the RF transceiver to be received by the remote RF transponder node units 30.

The operation of the CPU 11 of the programmable central server unit 10 is controlled by software programs to send instructions to and monitor the individual RF transponder node units 30, and to carry out various tasks in accordance with instructions inputted by a local operator through the keyboard 16, by clicking a mouse button, or other input device, or by telephone from a remote location via the modem 19. Some of the operations of the CPU 11 of the programmable central server unit 10 are also controlled by RF signals (encoded digital signals) transmitted from the individual RF transponder node units 30, as described hereinafter.

The central server 10 may be programmed to operate in selective or combined modes by a "global arm/disarm" program 21, a "violation alert" program 22, a "global alarm" program 23, a "low battery alert" program 24, an "inventory control" program 25, and a "vehicle locate" program 26 (described hereinafter). The central server may also be provided with a dialer program and recorded message stored in memory which will dial a predetermined and transmit the message via the modem 19.

Each RF transponder node unit 30 includes a plurality of sensors and interface circuitry 31 connected with an RF (radio frequency) transmitter and receiver, hereinafter referred to as RF transceiver 32 for transmitting and receiving RF signals to and from the central server 10 via antenna 33, and a programmable microprocessor chip 34 having memory storage. In normal operation, the RF transponder node unit 30 is powered by the vehicle battery, but each node unit is also provided with a back-up battery 35 for supplying power in the event that the battery current is below a predetermined level or is disconnected.

In a preferred embodiment, each RF transponder node unit 30 is provided with a conventional relay switching and intermittent timing circuit electrically connected between the battery and the horn and/or headlight wiring 36 of the vehicle. Each RF transponder node unit 30 may also be connected to an audible alarm 37 through the intermittent timing circuit such that the RF transponder node unit 30 will flash the lights, honk the horn, and/or sound the alarm for a preset time period when programmed to do so.

The interface circuitry 31, microprocessor circuitry, and connections between the components of the RF transponder node units 30 is conventional in the field of computers and electronics and is therefore not shown in detail. The relay switching and intermittent timing circuit of the RF transponder node units is also conventional in the art, and not shown in detail. The microprocessor 34 of the RF transponder node units 30 operates responsive to digital code signals which are encoded by the RF transceiver 32 and transmitted through the atmosphere between the central server 10 and the individual RF transponder node units. The microprocessor 34 is programmed to perform various tasks in accordance with instruction signals received from the central server 10. Each microprocessor 34 may also be provided with an encoded digital code number identifying the particular node unit.

Each RF transponder node unit 30 has one or more sensors for sensing the condition of the vehicle on which it is installed, and detecting a change in the condition. The sensors may include a battery current or voltage sensor 38 for sensing the battery current or voltage of the battery to which it is connected to detect if an attempt has been made to open a door or trunk or to start the vehicle, a shock sensor 39 for sensing a bump or jolt to the vehicle or breaking glass, and a tilt sensor 40 for sensing a change in the angular position of the vehicle in the event an attempt is made to jack up or tow the vehicle.

The sensors and sensor circuitry are conventional in the art and are connected through interface circuitry with the RF transceiver 32 and microprocessor 34 such that when one of the sensor circuits is completed by a violation, it will produce a sensor signal to trigger the RF transmitter to send an RF signal to the central server unit 10, and will simultaneously enter an alarm mode for approximately 30 to 60 seconds. In the alarm mode, the RF transponder node unit 30 sensing a violation will flash the lights, honk the horn, and/or sound the alarm. Optionally, each RF transponder node unit 30 has a battery disconnect circuit 41 which will disconnect the vehicle battery from the vehicle starting circuit when one of the sensor circuits is completed by a violation, and thereby prevent the vehicle from being started.

Global Arm/Disarm Mode

The central server 10, based on the input of the user will transmit an RF instruction signal to the RF transponder node units and will monitor all of the RF transponder node units 30 in the field. In the monitoring mode, the central server 10 is on a standby status waiting to receive an RF signal from an RF transponder node unit 30. The central server 10 can be selectively programmed to monitor in two ways: (1) it can be programmed to arm and/or disarm the RF transponder node units at set times each evening or morning; or (2) it can be programmed to arm the node units 24 hours a day and to override the sensors of individual RF transponder node units in order to test drive a particular vehicle and then re-arm the node unit. In the override mode, the central server 10 sends an RF override instruction signal to one or more RF transponder node units 30, and upon receipt of the override signal the node unit will complete a circuit that will disarm its sensors, or ignore the sensor signals until it has received a reset signal from the central server. In the disarmed mode, the node unit 30 will still will respond to an inventory control signal (described below) from the central server, such that the vehicle may be located and test driven or used as a demo vehicle.

Violation Alert Mode

Figure 2:
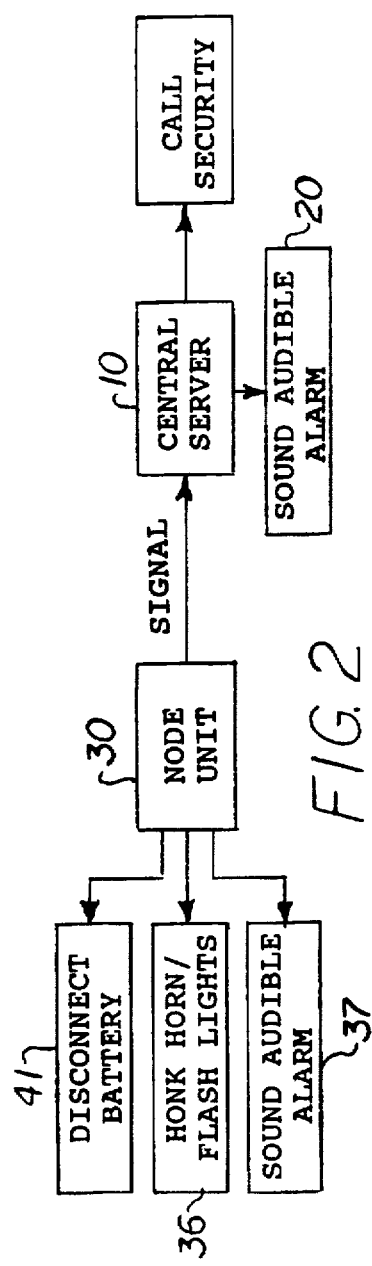
FIG. 2 is a block diagram illustrating the operation of the violation alert mode of the vehicle alarm and lot monitoring system.

Referring now to FIG. 2, when armed and one of the sensors of an RF transponder node unit 30 detects a violation it completes a circuit to invoke the switching and intermittent timing circuit which will flash the lights, honk the horn, and/or sound the alarm on the violated vehicle. The sensor signal is detected by the microprocessor 34 which causes the RF transceiver 32 to transmit a corresponding RF violation signal through the atmosphere to be received by the central server 10. Optionally, each RF transponder node unit 30 may be programmed to invoke the battery disconnect circuit upon receiving a sensor signal to disconnect the vehicle battery from the vehicle starting circuit and prevent the vehicle from being started.

Upon receiving the RF violation signal from an RF transponder node unit 30, the central server 10 will sound the audible perimeter alarm device 20, and if programmed to do so, will dial the telephone number of a remote monitoring center such as a security company or law enforcement agency via the modem 19 and play a recorded message to report that a violation has occurred. The central server 10 may also be programmed to transmit an RF "global panic" signal (described below) to all of the node units in the field upon receipt of a violation signal from any individual node.

Global Panic Alarm Mode

Figure 3:
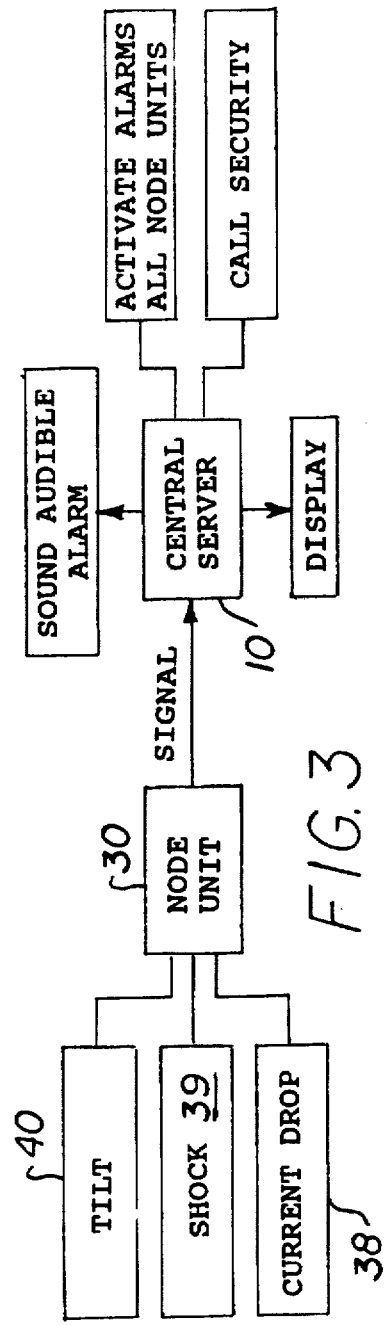
FIG. 3 is a block diagram illustrating the operation of the global panic security alarm mode of the vehicle alarm and lot monitoring system.

Referring now to FIG. 3, upon receiving a violation signal from an individual node unit 30, the central server 10 will transmit an RF "global panic" signal to all of the RF transponder node units in the field. When the RF transponder node units in the field receive this "global panic" signal from the central server they will trigger one or more types of alarms. If the node units are connected to the horn and/or headlight circuits of the vehicles and/or audible alarm, all of the vehicles will flash their lights, honk their horns, and/or sound their alarms for a preset time period. It should be noted that an individual RF transponder node unit will transmit a violation signal to the central server, and the central server then sends the "global panic alarm" signal to all of the nodes in the field. Thus, when one vehicle has sensed a violation, all of the vehicles in the field will sound an alarm.

The present vehicle alarm and lot monitoring system also performs other non-security functions (described below) which makes it particularly useful for automobile dealerships, used vehicle lots, and business vehicle fleets.

Inventory Control Mode

Figure 4:
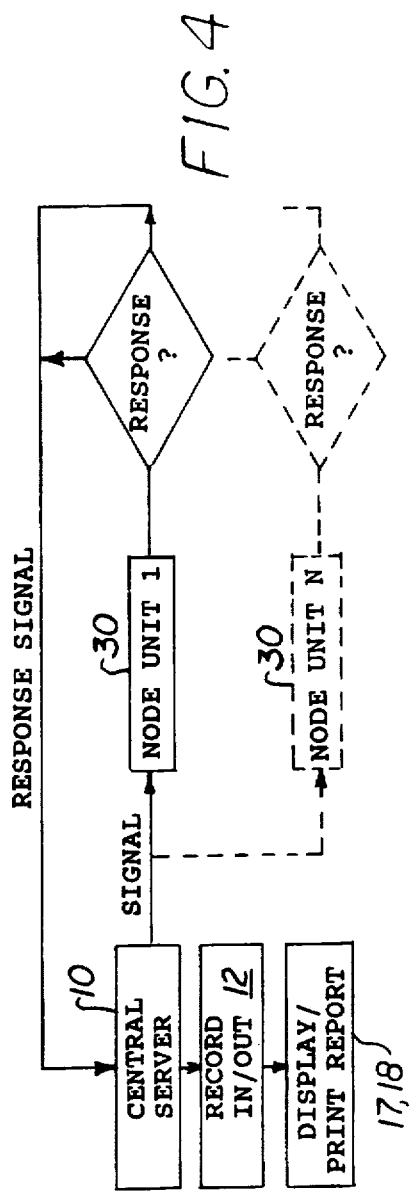
FIG. 4 is a block diagram illustrating the operation of the inventory control mode of the vehicle alarm and lot monitoring system.

Referring to FIG. 4, the central server 10 may be programmed to take inventory of every vehicle and RF transponder node unit in its database. An identification number is assigned to each individual RF transponder node unit 30 such that each identification number identifies a particular RF transponder node unit. The identification number of each RF transponder node unit and the corresponding identity (serial number or VIN number) of the respective individual vehicle on which it is installed is recorded in a database and stored in the central server memory.

The microprocessor 34 of each individual RF transponder node unit 30 is programmed to cause its RF transceiver 32 to receive an RF inventory polling signal transmitted from the central server 10, and to transmit an RF response signal upon receiving an RF inventory polling signal transmitted from the central server. The central server is instructed to sequentially transmit an RF inventory polling signal to each individual RF transponder node unit and to wait for a predetermined time interval to receive an RF response signal transmitted from the corresponding individual RF transponder node unit and to record which of the individual RF transponder node units has transmitted its RF response signal. The individual RF transponder node units which have transmitted its RF response signal within the time interval and the identity of the respective individual vehicle on it is installed will be recorded as being in inventory, and the individual RF transponder units which have not transmitted their RF response signal within the time interval and the identity of the respective individual vehicle on which it is installed will be recorded as being inactive or not in inventory. The central server 10 can then print out a report reflecting the node/vehicle inventory and identify the inactive RF transponder node units and vehicles associated therewith.

Low Battery Detection Mode

Figure 5:
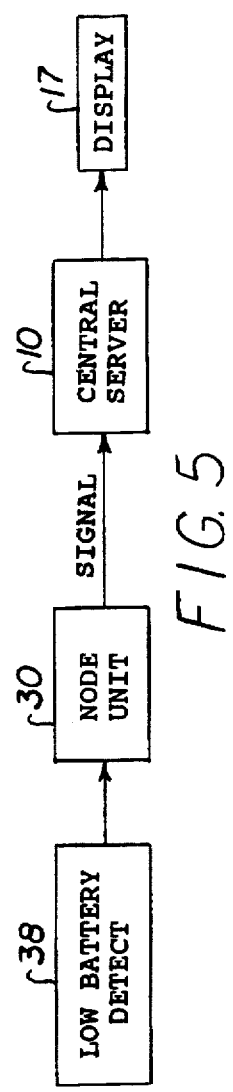
FIG. 5 is a block diagram illustrating the operation of the low battery detection mode of the vehicle alarm and lot monitoring system.

Referring now to FIG. 5, the central server 10 may be programmed to detect a low battery condition in every vehicle equipped with an RF transponder node unit 30. In the low battery detection mode, the low battery sensor circuitry of each RF transponder node unit 30 is interfaced with the battery of the vehicle on which it is installed to sense the current or voltage of the battery on which it is installed. If the low battery sensor detects that the battery current or voltage is below a predetermined level, it complete a circuit to cause its RF transceiver 32 to transmit an RF low battery signal to the central server 10. Should the battery current or voltage be too low to provide sufficient power, the back-up battery in the RF transponder node unit will take over to supply the power to transmit the low battery signal. When the central server 10 receives the low battery signal, it will record the identification number of the RF transponder node unit and the vehicle identification number in memory, and display this information on the display screen. The low battery signal may be sent to the central server 10 at timed intervals until the problem has been resolved. The central server 10 can also print out a report reflecting the identification of the vehicle having a low battery condition.

Vehicle Locate Mode

Figure 6:
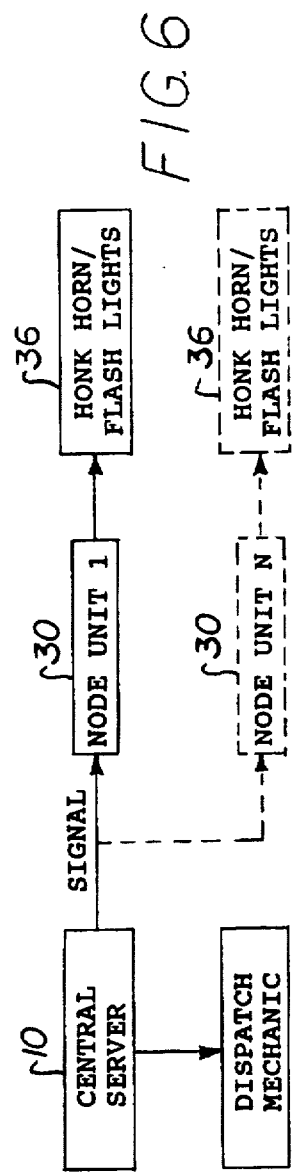
FIG. 6 is a block diagram illustrating the operation of the vehicle locate mode of the vehicle alarm and lot monitoring system.

Referring now to FIG. 6, the central server 10 may be programmed to quickly and easily locate a particular vehicle among a large number of vehicles. Each RF transponder node unit 30 is connected through its relay switching and timing circuit to the horn and/or headlight wiring 36 of the vehicle, as described above. In this mode, the operator inputs the vehicle identification number or the RF transponder node unit identification number corresponding to the vehicle to be located into the central server. The central server searches the database in memory and transmits an RF vehicle locate signal to the RF transponder node unit 30 installed on the vehicle to be located. When the RF transponder node unit 30 receives the vehicle locate signal from the central server 10, it completes the switching and timing circuit to intermittently supply power to the horn, headlights, and/or alarm to flash the lights, honk the horn, or sound the alarm in a distinctive pattern for a period of time enabling the activated vehicle to be easily located out of a group of vehicles. This feature is also particularly useful in the event that an RF transponder node unit has transmitted a low battery signal to the central server and a mechanic needs to find the vehicle in the storage lot.

Video Tracking Mode

Referring again to FIG. 1, the present vehicle alarm and monitoring system may also include a remote video camera recording device 50 to capture the perpetrators on video. One or more video cameras 51 are installed in a location to view a plurality of vehicles. Each video camera is provided with a servo motor 52 and universal swivel mount 53 to move the camera. The servo motor is connected with an RF receiver, antenna, and signal locking circuitry (not shown in detail). In this embodiment, the central server 10 may be programmed to transmit an RF latching signal to the camera upon receipt of an RF violation signal from a particular RF transponder node unit 30 that is transmitting the violation signal. When one of the sensors of an RF transponder node unit 30 detects a violation, the RF transponder node unit transmits an RF violation signal to the central server 10 and upon receiving the RF violation signal from the node unit, the central server unit 10 will transmit an RF latching signal to the camera causing it to lock in on the frequency of the RF transponder node unit sending the violation signal and to activate the servo motor and video camera recorder. Thus, the perpetrator may be identified, and if the vehicle is moved, the camera will follow the movement of the vehicle until out of range.

Thus, the present vehicle alarm and monitoring system provides audible alarm features, provides a global alarm "safety in numbers" principle of protection wherein all of the vehicles will flash their lights, sound their horn or an alarm when one of the vehicles has been violated and also provides features which allow a plurality of individual vehicles congregated together in a given area to be easily identified, inventoried, and located, making it particularly useful for automobile dealerships, used vehicle lots, and business fleets.

While this invention has been described fully and completely with special emphasis upon a preferred embodiment, it should be understood that within the scope of the appended claims the invention may be practiced otherwise than as specifically described herein.

I claim:

1. A method for monitoring a plurality of individual vehicles which are congregated together in a given area, comprising the steps of:

providing a central monitoring unit comprising:
   a programmable microprocessor and CPU with memory storage means, data input means, and display means operatively connected through associated circuitry with RF transceiver means operable for transmitting and receiving RF signals through the atmosphere, the operation of said microprocessor and CPU controlled by software programs to carry out various tasks in response to instructions inputted by a user and in response to received RF signals;

installing an individual programmable RF transponder unit on each individual vehicle respectively, each individual RF transponder unit comprising:

sensor means operable to sense the condition of the respective individual vehicle and to produce a sensor signal upon sensing a chance in the condition of said respective individual vehicle, alarm means for producing a perceivable alarm responsive to said sensor signal, RF transceiver means operable for transmitting and receiving RF signals through the atmosphere, a programmable microprocessor with memory storage means interfaced through associated circuitry with said sensor means, said alarm means, and said RF transceiver means to cause said RF transceiver means to transmit an RF violation signal through the atmosphere in response to receiving said sensor signal;

configuring said RF transceiver means of each said individual RF transponder unit to receive an RF global alarm signal transmitted through the atmosphere from said central monitoring unit and to produce said perceivable alarm responsive to said received said RF global alarm signal;

inputting data to instruct said central monitoring unit RF transceiver means to transmit an RF arming signal to activate said individual RF transponder units to sense a change in the condition of said respective individual vehicle;

inputting data to instruct said central monitoring unit RF transceiver means to transmit an RF global alarm signal to all of said activated individual RF transponder units upon receiving a said RF violation signal from any one of said individual RF transponder units; and inputting data to instruct said central monitoring unit to monitor all of said activated individual RF transponder units whereby said central monitoring unit assumes a standby status ready to receive said RF violation signal from any of said activated individual RF transponder units; whereby upon a said individual RF transponder unit sensor means sensing a change in the condition of said respective individual vehicle its said alarm means will produce a perceivable alarm and its said RF transceiver means will transmit said RF violation signal through the atmosphere to be received by said central monitoring unit; and upon said central monitoring unit RF transceiver means receiving said transmitted RF violation signal it will transmit said RF global alarm signal to all of said individual RF transponder units such that all of the individual RF transponder units on the respective individual vehicles will produce a perceivable alarm simultaneously.

2. A method according to claim 1 comprising the further steps of:

inputting data to instruct said central monitoring unit RF transceiver means to transmit an RF arming signal to activate, de-activate, and re-activate selected ones of said individual RF transponder units at a predetermined time.

3. A method according to claim 1 comprising the further steps of:

connecting each said individual RF transponder unit with the battery of each said respective individual vehicle whereby said vehicle battery is used to provide a primary source of electrical power thereto and to the starting circuit of each said respective vehicle;

providing each said individual RF transponder unit with an auxiliary power supply, switching means, and associated circuitry connected with its said microprocessor, its said RF transceiver means, its said sensor means, and its said alarm means for disconnecting said vehicle battery from said starting circuit of the respective individual vehicle on which it is installed and supplying power from said auxiliary power supply to said individual RF transponder unit when said vehicle battery is disconnected;

configuring each said individual said RF transponder unit to receive an RF battery disconnect instruction signal transmitted from said central monitoring unit and to activate its said switching means upon receiving said alarm signal from its said sensor means;

inputting data to instruct said central monitoring unit RF transceiver means to transmit an RF battery disconnect instruction signal to each said activated RF transponder unit instructing it to disconnect said vehicle battery from said starting circuit of the respective individual vehicle upon receipt of its said alarm signal from its said sensor means; whereby upon a said activated RF transponder unit sensing a change in the condition of the respective individual vehicle on which it is installed, its said switching means will disconnect said vehicle battery from said starting circuit of the respective individual vehicle and will thereafter be powered by said auxiliary power supply to activate its said alarm means to produce a perceivable alarm and activate its said RF transceiver means to transmit a corresponding RF violation signal through the atmosphere.

4. A method according to claim 1 comprising the further steps of:

providing each said individual RF transponder unit with intermittent timing means and associated circuitry connected with its said microprocessor, its said RF transceiver means, its said sensor means, and its said alarm means;

connecting each said individual RF transponder unit intermittent timing means with the battery and headlights of the respective individual vehicle in which it is installed for intermittently supplying electrical power to said headlights;

configuring said microprocessor of each individual said RF transponder unit to receive an RF flasher instruction signal transmitted from said central monitoring unit and to activate said intermittent timing means upon receiving said alarm signal from its said sensor means; and inputting data to instruct said central monitoring unit to transmit an RF flasher instruction signal to each said activated RF transponder unit instructing it to activate its said intermittent timing means upon receipt of said alarm signal from its said sensor means; whereby upon a said activated RF transponder unit sensing a change in the condition of the respective individual vehicle it will intermittently flash said headlights of the respective individual vehicle and activate its said RF transceiver means to transmit a corresponding RF violation signal through the atmosphere.

5. A method according to claim 1 comprising the further steps of:

providing each said individual RF transponder unit with intermittent timing means and associated circuitry connected with its said microprocessor, its said RF transceiver means, its said sensor means, and its said alarm means;

connecting each said individual RF transponder unit intermittent timing means with the battery and horn of the respective individual vehicle in which it is installed for intermittently supplying electrical power to said horn;

configuring said microprocessor of each individual said RF transponder unit to receive an RF horn instruction signal transmitted from said central monitoring unit and to activate said intermittent timing means upon receiving said alarm signal from its said sensor means; and inputting data to instruct said central monitoring unit to transmit an RF horn instruction signal to each said activated RF transponder unit instructing it to activate its said intermittent timing means upon receipt of said alarm signal from its said sensor means; whereby upon a said activated RF transponder unit sensing a change in the condition of the respective individual vehicle it will intermittently honk the horn of the respective individual vehicle and activate its said RF transceiver means to transmit a corresponding RF violation signal through the atmosphere.

6. A method according to claim 1 comprising the further steps of:

providing an audible perimeter alarm in the vacinity of the given area;

connecting said perimeter alarm with said central monitoring unit;

inputting data to instruct said central monitoring unit microprocessor to activate said audible perimeter alarm upon its said RF transceiver means receiving an RF violation signal from any of said activated individual RF transponder units; whereby said central monitoring unit will activate said audible perimeter alarm upon receiving an RF violation signal from any of said activated individual RF transponder units.

7. A method according to claim 1 comprising the further steps of:

providing said central monitoring unit with a dialing program, a recorded message stored in said memory means and a modem connected with a telephone line; and inputting data to instruct said central monitoring unit microprocessor to activate said modem, dial a telephone number, and play said recorded message upon receiving an RF violation signal from any of said activated individual RF transponder units.

8. A method according to claim 1 comprising the further steps of:

programming the microprocessor of each said individual RF transponder unit to cause its said RF transceiver means to receive an RF vehicle locate polling signal transmitted from said central monitoring unit, and to activate its said alarm means upon receiving said RF vehicle locate polling signal;

assigning an identification number to each said individual RF transponder unit such that each identification number identifies a particular RF transponder unit;

storing the identification number of each said particular RF transponder unit and the corresponding identity of each said respective individual vehicle on which it is installed in said central monitoring unit memory storage means;

inputting data to cause said central monitoring unit RF transceiver means to transmit an RF vehicle locate polling signal to a said particular RF transponder unit to instruct said particular RF transponder unit to activate its said alarm means; whereby the activated said alarm means will allow the respective said individual vehicle on which said particular RF transponder unit is installed to be easily located out of said plurality of individual vehicles which are congregated together in said given area.

9. A method according to claim 1 comprising the further steps of:

providing a video camera and recording means in the vacinity of said plurality of individual vehicles, said video camera and recording means having a universal swivel mount connected with a servo motor and including RF receiver means for receiving RF signals through the atmosphere and signal locking circuitry for operating said servo motor and said video camera and recording means to lock onto and follow the movement of a received RF signal;

programming the microprocessor of each said individual RF transponder unit to cause its said RF transceiver means to transmit an RF violation signal upon being activated by said sensor signal;

inputting data to instruct said central monitoring unit to transmit an RF camera locking signal to said video camera and recording means upon receiving an RF violation signal transmitted from an individual RF transponder unit; whereby said video camera and recording means will lock onto and follow the motion of the respective said individual RF transponder unit transmitting the RF violation signal until out of camera range.

10. A method for identifying and monitoring a plurality of individual vehicles which are congregated together in a given area and locating an individual vehicle in the plurality of vehicles, comprising the steps of;

providing a central monitoring unit having a programmable microprocessor and CPU with memory storage means, data input means, and display means operatively connected through associated circuitry with RF transceiver means operable for transmitting RF polling signals and RF vehicle locate signals and receiving RF response signals and RF low battery signals through the atmosphere, the operation of said microprocessor and CPU controlled by software programs to transmit and receive said signals in response to instructions inputted by a user and in response to received RF signals;

installing an individual programmable RF transponder unit on each individual vehicle respectively and connecting it with the battery of the respective vehicle to provide a primary source of electrical power thereto;

assigning an identification number to each said individual RF transponder unit such that each identification number identifies a particular RF transponder unit;

storing the identification number of each said particular RF transponder unit and the corresponding identity of each said respective individual vehicle on which it is installed in said central monitoring unit memory storage means;

each said individual RF transponder unit having a programmable microprocessor with memory storage means interfaced through associated circuitry With RF transceiver means for receiving RF inventory palling signals and RF vehicle locate signals and transmitting RF response signals and RF low batter signals through the atmosphere in response to RF signals received from said central monitoring unit;

each said individual RF transponder unit having an auxiliary power supply, battery voltage sensor means operable to sense the voltage of the battery of the respective individual vehicle in which it is installed and to produce a sensor signal upon sensing a predetermined low voltage condition of said battery, and associated circuitry connected with its said microprocessor, its said RF transceiver means, its said battery voltage sensor means, and its said auxiliary power supply for supplying power from said auxiliary power supply to its said RF transceiver means upon receiving said sensor signal;

each said individual RF transponder unit having alarm means and associated circuitry interfaced with its said microprocessor and its said RF transceiver means for producing a perceivable alarm responsive to receiving an RF vehicle locate signal transmitted from said central monitoring unit;

programming said microprocessor of each said individual RF transponder unit to cause its said RF transceiver means to transmit an RF response signal upon receiving an RF inventory polling signal;

inputting data to instruct said central monitoring unit RF transceiver means to sequentially transmit an RF inventory polling signal to a said individual RF transponder unit and to wait for a predetermined time interval to receive an RF response signal transmitted from the corresponding individual RF transponder unit and to record which of said individual RF transponder units has transmitted its said RF response signal;

recording the identity of the respective individual RF transponder units which have transmitted said RF response signal within said tie interval and the identity of the respective said individual vehicle on which it is installed and being in inventory, and recording the identity of the respective said individual RF transponder units which have not transmitted said RF response signal within said time interval and the identity of the respective said individual vehicle on which it is installed as being inactive or not in inventory;

programming said microprocessor of each said individual RF transponder unit to cause its said RP transceiver means to transmit an RF low battery signal through the atmosphere in response to receiving said sensor signal from its said battery voltage sensor means;

inputting data to instruct said central monitoring unit RF transceiver means to receive an RF low battery signal transmitted from an individual RF transponder unit; and recording the identification number of the individual RF transponder units that have transmitted its said RF low battery signal and the identity of the respective said individual vehicle on which it is installed;

programming said microprocessor of each said individual RF transponder unit to cause its said RF transceiver means to receive an RF vehicle locate polling signal transmitted from said central monitoring unit, and to activate its said alarm means upon receiving said RF vehicle locate signal;

inputting data to cause said central monitoring unit RF transceiver means to transmit an RF vehicle locate polling signal to a said individual RF transponder unit to cause said individual RP transponder unit to activate its said alarm means; whereby the respective said individual vehicle with on which said individual RF transponder unit is alarm means is activated may be easily located out of said plurality of individual vehicles which are congregated together in said given area.

11. A method according to claim 10 comprising the further steps of:

providing each individual RF transponder unit with intermittent timing means and associated circuitry interfaced with its said microprocessor and its said RF transceiver means;

connecting each said individual RF transponder unit intermittent timing means with the battery and headlights of the respective individual vehicle on which it is installed for intermittently supplying electrical power to said headlights;

programming said microprocessor of each said individual RF transponder unit to receive an RF flasher instruction signal transmitted from said central monitoring unit and to activate its said intermittent timing means upon receiving said RF flasher instruction signal;

inputting data to instruct said central monitoring unit to transmit an RF flasher instruction signal to a said individual RF transponder unit to instruct said individual RF transponder to activate its said intermittent timing means to intermittently flash the headlights of said respective vehicle; whereby the respective said individual vehicle on which said individual RF transponder unit is installed may be easily located out of said plurality of individual vehicles which are congregated together in said given area.

12. A method according to claim 10 comprising the further steps of:

providing each individual RF transponder unit with intermittent timing means and associated circuitry interfaced with its said microprocessor and its said RF transceiver means;

connecting each said individual RF transponder unit intermittent timing means with the battery and horn of the respective individual vehicle on which it is installed for intermittently supplying electrical power to said horn;

programming said microprocessor of each said individual RF transponder unit to receive an RF horn instruction signal transmitted from said central monitoring unit and to activate its said intermittent timing means upon receiving said RF horn instruction signal;

inputting data to instruct said central monitoring unit to transmit an RF horn instruction signal to a said individual RF transponder unit to instruct said individual RF transponder to activate its said intermittent timing means to intermittently honk the horn of said respective vehicle; whereby the respective said individual vehicle on which said individual RF transponder unit is installed may be easily located out of said plurality of individual vehicles which are congregated together in said given area.

13. A system for monitoring a plurality of individual vehicles which are congregated together in a given area comprising:

a central monitoring unit including: monitoring unit RF transceiver means operable for transmitting and receiving RF signals through the atmosphere; a programmable microprocessor and CPU with memory storage means, data input means, and display means operatively connected through associated circuitry with said monitoring unit RF transceiver means and programmed to cause said monitoring unit RF transceiver means to transmit and receive RF signals through the atmosphere;

a plurality of individual programmable RF transponder units, each individual RF transponder unit comprising:

attachment means for attaching said RF transponder unit to a respective one of said individual vehicles;

sensor means operable to sense the condition of said respective individual vehicle and to produce a sensor signal upon sensing a change in the condition of said respective individual vehicle;

alarm means connected with said sensor means for producing a perceivable alarm responsive to said sensor signal;

transponder unit RF transceiver means operable for transmitting and receiving RF signals through the atmosphere; and a programmable microprocessor with memory storage means and associated circuitry operatively connected with said sensor means, said alarm means, and said transponder unit RF transceiver means and programmed to cause said transponder unit RF transceiver means to transmit an RF violation signal through the atmosphere responsive to said sensor signal;

an arm/disarm software program stored in said monitoring unit memory storage means for controlling the operation of said central monitoring unit microprocessor and CPU and said monitoring unit RF transceiver means in response to data input by a user to cause said monitoring unit RF transceiver means to transmit an RF arming signal to activate said individual RF transponder units to sense a change in the condition of the respective individual vehicles, and to assume a standby monitoring status ready to receive an RF violation signal from any of said activated individual RF transponder units;

a global alarm software program stored in said monitoring unit memory storage means for controlling the operation of said central monitoring unit microprocessor and CPU and said monitoring unit RF transceiver means to cause said monitoring unit RF transceiver means to transmit an RF global alarm signal to all of said activated individual RF transponder units upon receiving a said RF violation signal from any one of said individual RF transponder units;

said RF transceiver means of each said individual RF transponder unit configured to receive an RF global alarm signal transmitted through the atmosphere from said central monitoring unit; and said alarm means of each said individual RF transponder unit is configured to produce said perceivable alarm responsive to a received said RF global alarm signal; whereby upon said sensor means of any one of said activated individual RF transponder units sensing a change in the condition of the respective individual vehicle on which it is installed, its said alarm means will produce a perceivable alarm and its said transponder unit RF transceiver means will transmit said RF violation signal through the atmosphere to be received by said central monitoring unit; and upon said central monitoring unit RF transceiver means receiving said transmitted RF violation signal it will transmit said RF global alarm signal to all of said activated individual RF transponder units such that all of the individual RF transponder units on the respective individual vehicles will produce a perceivable alarm simultaneously.

14. A system according to claim 13 wherein:

said central monitoring unit microprocessor and CPU and its said RF transceiver means is programmed to cause its said RF transceiver means to transmit an RF arming signal to activate, de-activate, and re-activate selected ones of said individual RF transponder units at predetermined times in response to data input by a user.

15. A system according to claim 13 wherein:

each said individual RF transponder unit is operatively connected with the battery of each said respective individual vehicle such that said vehicle battery provides a primary source of electrical power thereto and to the starting circuit of each said respective vehicle;

each said individual RF transponder unit further comprises an auxiliary power supply, switching means, and associated circuitry connected with its said microprocessor, its said RF transceiver means, its said sensor means, and its said alarm means for disconnecting said vehicle battery from said starting circuit of the respective individual vehicle on which it is installed and supplying power from said auxiliary power supply to said individual RF transponder unit when said vehicle battery is disconnected;

each said individual said RF transponder unit is configured to receive an RF battery disconnect instruction signal transmitted from said central monitoring unit and to activate its said switching means upon receiving said alarm signal from its said sensor means;

said central monitoring unit microprocessor and CPU and its said RF transceiver means is programmed to cause its said RF transceiver means to transmit an RF battery disconnect instruction signal to each said activated RF transponder unit instructing it to disconnect said vehicle battery from said starting circuit of the respective individual vehicle upon receipt of its said alarm signal from its said sensor means; such that upon a said activated RF transponder unit sensing a change in the condition of the respective individual vehicle on which it is installed, its said switching means will disconnect said vehicle battery from said starting circuit of the respective individual vehicle and will thereafter be powered by said auxiliary power supply to activate its said alarm means to produce a perceivable alarm and activate its said RF transceiver means to transmit a corresponding RF violation signal through the atmosphere.

16. A system according to claim 13 wherein:

each said individual RF transponder unit further comprises intermittent timing means and associated circuitry connected with its said microprocessor, its said RF transceiver means, its said sensor means, and its said alarm means;

said intermittent timing means is connected with the battery and headlights of the respective individual vehicle in which it is installed for intermittently supplying electrical power to said headlights;

said microprocessor of each said individual RF transponder unit is configured to receive an RF flasher instruction signal transmitted from said central monitoring unit and to activate its said intermittent timing means upon receiving said alarm signal from its said sensor means; and said central monitoring unit microprocessor and CPU and its said RF transceiver means is programmed to cause its said RF transceiver means to transmit an RF flasher instruction signal to each said activated RF transponder unit instructing it to activate its said intermittent timing means upon receipt of said alarm signal from its said sensor means; such that upon a said activated RF transponder unit sensing a change in the condition of the respective individual vehicle it will intermittently flash said headlights of the respective individual vehicle and activate its said RF transceiver means to transmit a corresponding RF violation signal through the atmosphere.

17. A system according to claim 13 wherein:

each said individual RF transponder unit further comprises intermittent timing means and associated circuitry connected with its said microprocessor, its said RF transceiver means, its said sensor means, and its said alarm means;

said intermittent timing means is connected with the battery and horn of the respective individual vehicle in which it is installed for intermittently supplying electrical power to said horn;

said microprocessor of each said individual RF transponder unit is configured to receive an RF horn instruction signal transmitted from said central monitoring unit and to activate said intermittent timing means upon receiving said alarm signal from its said sensor means; and said central monitoring unit microprocessor and CPU and its said RF transceiver means is programmed to cause its said RF transceiver means to transmit an RF horn instruction signal to each said activated RF transponder unit instructing it to activate its said intermittent timing means upon receipt of said alarm signal from its said sensor means; such that upon a said activated RF transponder unit sensing a change in the condition of the respective individual vehicle it will intermittently honk the horn of the respective individual vehicle and activate its said RF transceiver means to transmit a corresponding RF violation signal through the atmosphere.

18. A system according to claim 13 further comprising:

an audible perimeter alarm in the vacinity of the given area operatively connected with said central monitoring unit; and said central monitoring unit microprocessor and CPU and its said RF transceiver means is programmed to activate said audible perimeter alarm upon its said RF transceiver means receiving an RF violation signal from any of said activated individual RF transponder units; such that said central monitoring unit will activate said audible perimeter alarm upon receiving an RF violation signal from any of said activated individual RF transponder units.

19. A system according to claim 13 further comprising:

a dialing program and recorded message stored in said central monitoring unit and CPU memory storage means; and a modem operatively connected with said central monitoring unit and CPU and with a telephone line; and said central monitoring unit microprocessor and CPU and its said RF transceiver means is programmed to activate said modem, dial a telephone number, and play said recorded message upon receiving an RF violation signal from any of said activated individual RF transponder units.

20. A system according to claim 13 wherein:

said microprocessor and RF transceiver means of each said individual RF transponder unit is programmed to cause its said RF transceiver means to receive an RF vehicle locate polling signal transmitted from said central monitoring unit, and to activate its said alarm means upon receiving said RF vehicle locate polling signal;

each said individual RF transponder unit is assigned a respective identification number;

said identification number of each said individual RF transponder unit and the corresponding identity of each said respective individual vehicle on which it is installed is stored in said central monitoring unit memory storage means;

said central monitoring unit microprocessor and CPU and its said RF transceiver means is programmed to cause its said RF transceiver means to transmit an RF vehicle locate polling signal to selected individual RF transponder units to instruct said selected individual RF transponder unit to activate its said alarm means; such that the activated said alarm means will allow the respective said individual vehicle on which said selected RF transponder unit is installed to be easily located out of said plurality of individual vehicles which are congregated together in said given area.

21. A system according to claim 13 further comprising:

a video camera and recording means in the vacinity of said plurality of individual vehicles, said video camera and recording means having a universal swivel mount connected with a servo motor and including RF receiver means for receiving RF signals through the atmosphere and signal locking circuitry for operating said servo motor and said video camera and recording means to lock onto and follow the movement of a received RF signal;

said microprocessor and said RF transceiver means of each said individual RF transponder unit is programmed to cause its said RF transceiver means to transmit an RF violation signal upon being activated by said sensor signal; and said central monitoring unit microprocessor and CPU and its said RF transceiver means is programmed to cause its said RF transceiver means to transmit an RF camera locking signal to said video camera and recording means upon receiving an RF violation signal transmitted from an individual RF transponder unit; such that said video camera and recording means will lock onto and follow the motion of the respective said individual RF transponder unit transmitting the RF violation signal until out of camera range.

22. A system for identifying and monitoring a plurality of individual vehicles which are congregated together in a given area and locating an individual vehicle in the plurality of vehicles, the system comprising:

a central monitoring unit including RF transceiver means operable for transmitting and receiving RF signals through the atmosphere, a programmable microprocessor and CPU with memory storage means, data input means, and display means operatively connected through associated circuitry with said RF transceiver means and programmed to cause its said RF transceiver means to transmit RF inventory polling signals and RF vehicle locate signals and to receive RF response signals and RF low battery signals through the atmosphere;

software programs stored in said central monitoring unit memory storage means for controlling the operation of said central monitoring unit microprocessor and CPU and its said RF transceiver means in response to data input by a user to cause its said RF transceiver means to transmit said RF inventory polling signals and said RF vehicle locate signals to activate said individual RF transponder units in response to instructions input by a user and in response to received RF response signals;

a plurality of individual programmable RF transponder units each installed on and connected with the battery of a respective said individual vehicle to provide a primary source of electrical power thereto, and each assigned a respective identification number, said identification number of each said individual RF transponder unit and the corresponding identity of each said respective individual vehicle on which it is installed being stored in said central monitoring unit memory storage means;

each said individual RF transponder units having RF transceiver means operable for transmitting and receiving RF signals through the atmosphere, a programmable microprocessor with memory storage means interfaced through associated circuitry with its said RF transceiver means and programmed to cause its said RF transceiver means to transmit an RF response signal upon receiving an RF inventory polling signal transmitted from said central monitoring unit;

each said individual RF transponder unit having alarm means and associated circuitry interfaced with its said microprocessor and its said RF transceiver means for producing a perceivable alarm, and its said microprocessor and RF transceiver means programmed to cause its said RF transceiver means to receive an RF vehicle locate signal transmitted from said central monitoring unit and to activate its said alarm means responsive thereto;

each said individual RF transponder unit having an auxiliary power supply and battery voltage sensor means operable to sense the voltage of the battery of the respective individual vehicle in which it is installed and to produce a sensor signal upon sensing a predetermined low voltage condition of said battery, and associated circuitry connected with its said microprocessor, its said RF transceiver means, its said battery voltage sensor means, and its said auxiliary power supply for supplying power from said auxiliary power supply to its said RF transceiver means upon receiving said sensor signal, and its said microprocessor and RF transceiver means programmed to cause its said RF transceiver means to transmit an RF low battery signal through the atmosphere in response to receiving said sensor signal from its said battery voltage sensor means;

said central monitoring unit microprocessor and its said RF transceiver means programmed to receive said RF low battery signal transmitted from said individual RF transponder unit and to record the identification number of said individual RF transponder unit that transmitted said RF low battery signal and the identity of the respective said individual vehicle on which it is installed;

said central monitoring unit microprocessor and its said RF transceiver means programmed to cause its said RF transceiver means to sequentially transmit an RF inventory polling signal to selected individual RF transponder units and to wait for a predetermined time interval to receive a said RF response signal from each said selected individual RF transponder unit, and to record which of said individual RF transponder units has transmitted its said RF response signal, whereby the individual RF transponder units which have transmitted said RF response signal within said time interval and the identity of the respective said individual vehicle on which it is installed will be recorded as being in inventory, and the individual RF transponder units which have not transmitted said RF response signal within said time interval and the identity of the respective said individual vehicle on which it is installed will be recorded as being inactive or not in inventory; and said central monitoring unit microprocessor and RF transceiver means is programmed to cause its said RF transceiver means to transmit an RF vehicle locate polling signal to a said individual RF transponder unit to cause said individual RF transponder unit to activate said alarm means; whereby the respective said individual vehicle with on which said individual RF transponder unit alarm means is activated may be easily located out of said plurality of individual vehicles which are congregated together in said given area.

23. A system according to claim 22 wherein:

each said individual RF transponder unit further comprises intermittent timing means and associated circuitry interfaced with its said microprocessor and its said RF transceiver means;

each said individual RF transponder unit intermittent timing means is connected with the battery and headlights of the respective individual vehicle on which it is installed for intermittently supplying electrical power to said headlights;

each said individual RF transponder unit microprocessor and RF transceiver means is programmed to receive an RF flasher instruction signal transmitted from said central monitoring unit and to activate its said intermittent timing means upon receiving said RF flasher instruction signal; and said central monitoring unit microprocessor and RF transceiver means id programmed to cause its said RF transceiver to transmit an RF flasher instruction signal to a said individual RF transponder unit to instruct said individual RF transponder to activate its said intermittent timing means to intermittently flash the headlights of said respective vehicle; such that the respective said individual vehicle on which said individual RF transponder unit is installed may be easily located out of said plurality of individual vehicles which are congregated together in said given area.

24. A system according to claim 22 wherein:

each said individual RF transponder unit further comprises intermittent timing means and associated circuitry interfaced with its said microprocessor and its said RF transceiver means;

each said individual RF transponder unit intermittent timing means is connected with the battery and horn of the respective individual vehicle on which it is installed for intermittently supplying electrical power to said horn;

each said individual RF transponder unit microprocessor and RF transceiver means is programmed to receive an RF horn instruction signal transmitted from said central monitoring unit and to activate its said intermittent timing means upon receiving said RF horn instruction signal; and said central monitoring unit microprocessor and RF transceiver means is programmed to cause its said RF transceiver to transmit an RF horn instruction signal to a said individual RF transponder unit to instruct said individual RF transponder to activate its said intermittent timing means to intermittently honk the horn of said respective vehicle; such that the respective said individual vehicle on which said individual RF transponder unit is installed may be easily located out of said plurality of individual vehicles which are congregated together in said given area.

* * * * *